United States Patent [19]

Kostrzecha

[11] Patent Number: 5,397,509

[45] Date of Patent: Mar. 14, 1995

[54] FIRE RETARDANT COMPOSITION FOR ABSORBENT MATERIAL

[75] Inventor: Gregory E. Kostrzecha, Coral Springs, Fla.

[73] Assignee: Three Star Products, Inc., Ft. Lauderdale, Fla.

[21] Appl. No.: 37,911

[22] Filed: Mar. 26, 1993

[51] Int. Cl.$^6$ .................. C09K 21/04; C09K 21/06
[52] U.S. Cl. ...................................... 252/607; 252/608
[58] Field of Search ...................... 252/601, 608, 607

[56] References Cited

U.S. PATENT DOCUMENTS

| | | | |
|---|---|---|---|
| 4,212,675 | 7/1980 | Robinson | 106/18.15 |
| 4,595,414 | 6/1986 | Shutt | 106/18.16 |
| 5,076,969 | 12/1991 | Fox | 252/601 |

*Primary Examiner*—Robert L. Stoll
*Assistant Examiner*—Joseph D. Anthony
*Attorney, Agent, or Firm*—Malin, Haley, DiMaggio & Crosby

[57] ABSTRACT

A fire retardant composition and process for treating water absorbent material such as natural and synthetic fibers used in fabrics or paper or cardboard-like materials, which utilizes dibasic ammonium phosphate, dibasic ammonium sulfate, and ammonium biborate, mixed with water, that is applied to the fabric, allowed to soak in, and then dry to create the fire retardant characteristics. The composition and process is especially useful for items such as a terrycloth blanket, which itself can be used to smother fires as a safety device.

5 Claims, No Drawings

FIRE RETARDANT COMPOSITION FOR ABSORBENT MATERIAL

BACKGROUND OF THE INVENTION

1. Field of the Invention

This invention relates to a fire retardant composition that is water soluble for use with absorbent materials, and in particular, to an improved fire retardant composition that can be used with blankets or other fibrous cloth or paper materials that can be sprayed on or soaked for absorption into the fibers using a chemical composition that is not considered dangerous. The composition greatly raises the combustion temperature of the underlying material to act as a fire retardant.

2. Description of the Prior Art

Fire retardant compositions are known in the prior art. Basically, the purpose of a fire retardant is to raise the combustion temperature of a particular material and to greatly reduce the burn rate at which a fire will progress, especially in an internal environment where people may be present. Also, safety devices which may be used to put out fires can contain a fire retardant to greatly raise the ignition point or ignition temperature of the material to act as an improved device for putting out a fire.

Of equal concern in today's society is the environmental impact of toxic chemicals, even if they are suitable for use as a fire retardant.

U.S. Pat. No. 4,168,175 issued to Shutt Sep. 18, 1979 describes fire retardant compositions for a non-caking compound that may be combined with fibers of cellulose material with a solid agent. U.S. Pat. No. 4,992,215 issued to Green Feb. 12, 1991 shows a polymer fire retardant precipitated from an aqueous mixture. U.S. Pat. No. 4,842,611 issued to Huffman Jun. 27, 1989 describes a flame retardant composition in process suitable for textile fabrics using natural or synthetic fibers. U.S. Pat. No. 4,126,473 issued to Sobolev et al. Nov. 21, 1978 shows a flame retardant composition for cellulosic boards, particularly for hard boards, particle boards, and fiber boards.

The present invention provides for an improved fire retardant composition that can be used with fibers, either natural or synthetic, or other highly absorbant materials such as paper towels, cardboard materials, or the like, and that can be sprayed on or soaked into the fibers. The composition consists of dibasic ammonium phosphates, dibasic ammonium sulfates, ammonium biborates, and a surfactant in conjunction with a water base. Items may be sprayed, dipped, or brushed with the composition. As an example, a blanket may be made from terrycloth that is dipped or treated with the material and then dried out so that the blanket can be used as a safety device to smother a fire.

SUMMARY OF THE INVENTION

A fire retardant composition that is water soluble for use with absorbent materials such as fabrics, that will make the material fire retardant to withstand a Class A or better fire rating, consisting of a mixture of dibasic ammonium phosphate, dibasic ammonium sulfate, ammonium biborate, and a surfactant to enhance the penetration of the mixture. The composition includes mixing the constituent elements with warm water until a homogenous uniform mixture is achieved. An item such as a blanket made of terrycloth is then dipped, sprayed, or brushed with the water soluble composition. Once the composition has soaked into the material, then the material is dried in a dryer.

The invention is also suitable for use with paper and paper-like, water absorbent materials or cardboard, which also readily absorb water.

The composition in accordance with the present invention is water soluble, and thus, is based with water, which is used to allow the materials to be uniformly soaked fibers or fiber-like materials for penetration. A surfactant is used to enhance the penetration.

Another embodiment of the invention is the method wherein the composition is mixed with warm water at 50° C. and then allows a fabric or fibrous items such as a blanket to be soaked or dipped in the composition. The blanket is then wrung out and dried in a dryer at less than 250° F., or can be dried in open air at room temperature.

When extinguishing a fire, the blanket leaves no messy residue, unlike a fire extinguisher, which makes the blanket ideal for restaurant applications. The blanket is also ideal for maine galley applications. Also, in a fire, a person could wrap himself with the blanket to prevent burns when exiting a fire.

The composition can be introduced into certain products during the manufacturing process to render the finished product fire retardant such as paper or cardboard packaging materials.

It is an object of this invention to provide an improved, fire retardant composition that is water soluble and greatly enhances fire retardant capabilities of fibrous or water absorbent materials such as fabrics or paper products.

It is another object of this invention to provide an improved fire retardant composition that utilizes chemicals that are not environmentally harmful and which are economical in use.

It is another object of this invention to provide a fire retardant composition that is easy to apply to fabric materials to render them fire retardant.

And yet another object of this invention is to provide an improved process for preparing a blanket or other item to become fire retardant using an improved fire retardant composition.

In accordance with these and other objects which will be apparent hereinafter, the instant invention will now become described with particular reference to the accompanying drawings.

DESCRIPTION OF THE PREFERRED EMBODIMENTS

The flame retardant composition in accordance with the present invention includes the use of dibasic ammonium phosphates and dibasic ammonium sulfates in conjunction with ammonium biborate to form a water soluble mixture. A surfactant, such as known under the name Triton X, is also used in small amounts for penetration purposes. The use of the composition by dry weight will include 20% ammonium phosphate, 45.7% ammonium sulfate, 34% ammonium biborate, and 0.3% surfactant, using Triton X, all of this measured with dry weight.

The ammonium phosphate, the ammonium sulfate, and ammonium biborate are mixed with ratios of 2 lbs. per gallon of water, including the surfactant, into warm water at approximately 50° C., where it is mixed into the water thoroughly. Once the chemicals have been mixed in the water, then an item to be treated can be sprayed, dipped, or brushed with the composition in a liquid state so that it thoroughly penetrates fibers, such as of a blanket. Once soaked thoroughly, the blanket would be wrung out and dried in a dryer at a temperature less than 250° F. or dried in open air at room temperature.

Note that the absorbent material or fabric should not be washed after treatment because the composition can be washed out because of water solubleness.

It is believed that the percentage by dry weight could be from 15% to 25% of ammonium phosphate, 40.7%–50.7% of dibasic ammonium sulfate, 29%–39% of ammonium biborate, and surfactant of 0.3%. Note that the surfactant is not deemed necessary for the overall fire retardant function of the device, but is used to enhance the ability of the composition in a liquid state to soak into the fibers more fully.

EXAMPLE NO. 1

A terrycloth blanket made of 100% cotton is selected with 14 oz. weight to be treated with the composition. A dibasic ammonium phosphate of 20% by dry weight is combined with dibasic ammonium sulfate at 45.7% by dry weight, and ammonium biborate, at 34% dry weight, and a surfactant such as nonionic surfactant polyethelated nonlyphenol, sold under the trademark Triton X at 0.3% by dry weight are all uniformly mixed together. Two pounds of uniform mixture of these materials in these dry weight ratios are mixed with a gallon of warm water (50° C.). After the materials are thoroughly mixed with the water, the blanket is dipped and soaked in the composition. Once it is fully soaked, the blanket is wrung out and placed in a dryer with a maximum temperature of less than of 250° F. or dried in open air at room temperature.

The blanket is then used and capable of being used as a fire retardant or firefighting device such as to smother a kitchen fire on a stove. Larger blankets can be used for larger fires. Other uses could include automobile interiors or suits for race car drivers in literally any fabric that allows a soaking action, such as cotton, with a water soluble material. In addition, paper toweling or soakable paper products and cardboard boxes can be treated with the material. The composition has been tested and found to be fire retardant.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A process for retarding the flammability of absorbent materials selected from the group consisting of fabrics, fibers, and papers, said process consisting of:
    immersing the fabrics or fibers or papers in a mixture of dibasic ammonium phosphate, dibasic ammonium sulfate, ammonium biborate, a surfactant selected from Triton X, and water, in a dry rate ratio of 20% ammonium phosphate, 45.7% dibasic ammonium sulfate, 34% ammonium biborate, and 0.3% surfactant, all of which is then mixed with water in a ratio of two pounds of said dry mixture to one gallon of water;
    wringing out the mixture from the fabrics or fibers or papers; and
    drying the fabrics or fibers or papers below 250° F.

2. A flame retardant composition suitable for spraying, dipping, or applying to a fibrous material, such as a blanket or other water absorbent material, consisting of:
    an admixture of dibasic ammonium phosphate, dibasic ammonium sulfate, and ammonium biborate, in a dry state ratio of 15%–25% of ammonium phosphate, 40.7%–50.7% of dibasic ammonium sulfate, 29%–39% of ammonium biborate, all of which, when mixed to a 2 lb. dry weight mixture, would be mixed with one gallon of water.

3. A flame retardant composition suitable for spraying, dipping, or applying to a fibrous material, such as a blanket or other water absorbent material, consisting of:
    an admixture of dibasic ammonium phosphate, dibasic ammonium sulfate, ammonium biborate, and a surfactant selected from Triton X, in a dry state ratio of 15%–25% of ammonium phosphate, 40.7%–50.7% of dibasic ammonium sulfate, 29%–39% of ammonium biborate, a surfactant such as Triton X in the amount of 0.3% dry weight, all of which, when mixed to a 2 lb. dry weight mixture, would be mixed with one gallon of water.

4. A flame retardant composition suitable for spraying, dipping, or applying to a fibrous material, such as a blanket or other water absorbent materials, consisting of:
    an admixture of dibasic ammonium phosphate, dibasic ammonium sulfate, and ammonium biborate, in a dry rate ratio of 20% ammonium phosphate, 45.7% dibasic ammonium sulfate, and 34.3% ammonium biborate, all of which when mixed to a two pound dry weight mixture would be mixed with one gallon of water.

5. A flame retardant composition suitable for spraying, dipping, or applying to a fibrous material, such as a blanket or other water absorbent materials, consisting of:
    an admixture of dibasic ammonium phosphate, dibasic ammonium sulfate, and ammonium biborate, in a dry state ratio of 20% ammonium phosphate, 45.7% dibasic ammonium sulfate, and 34.0% ammonium biborate, all of which when mixed to a two pound dry weight mixture would be mixed with one gallon of water; and
    a surfactant selected from Triton X in the amount of 0.3% dry weight.

* * * * *